United States Patent
Palmason et al.

[15] 3,646,879
[45] Mar. 7, 1972

[54] AUTOMATIC BROILING APPARATUS

[72] Inventors: Einar H. Palmason; Harry R. Stevens, both of Fort Lauderdale, Fla.

[73] Assignee: Parkson Corporation, Fort Lauderdale, Fla.

[22] Filed: Mar. 21, 1969

[21] Appl. No.: 809,148

[52] U.S. Cl. ............................. 99/339, 74/242.14, 99/349, 99/355, 99/386, 99/391, 99/427, 99/443 C, 99/446
[51] Int. Cl. ............................................. A47j 37/00
[58] Field of Search ................... 198/131, 429, 154, 162; 74/242.14; 99/339, 349, 355, 400, 386, 387, 389, 391, 393, 427, 443, 446, 450, 107, 1; 126/41 C

[56] References Cited

UNITED STATES PATENTS

| | | | |
|---|---|---|---|
| 3,528,361 | 9/0970 | Le Van | 99/386 X |
| 1,473,213 | 11/1923 | De Matteis | 99/386 |
| 2,032,272 | 2/1936 | Feltman | 99/386 |
| 2,109,079 | 2/1938 | Zeigler et al. | 99/386 X |
| 2,149,566 | 3/1939 | Anderson | 99/386 |
| 2,238,309 | 4/1941 | Cramer | 99/386 |
| 2,504,110 | 4/1950 | Davis et al. | 99/386 X |
| 2,618,163 | 11/1952 | Russell | 74/242.14 |
| 2,655,096 | 10/1953 | Ebin | 99/443 X |
| 3,448,678 | 6/1969 | Burstein | 99/386 |
| 3,454,142 | 7/1969 | Holstein | 198/162 |

*Primary Examiner*—Billy J. Wilhite
*Attorney*—Stevens, Davis, Miller & Mosher

[57] ABSTRACT

An automatic apparatus for broiling comestibles having a guiding and conveying mechanism for transporting comestibles in a vertical position through spaced infrared broiling elements where the comestibles are continuously cooked from both sides simultaneously as they travel through the elements and after broiling are continuously removed from the guiding and conveying means.

19 Claims, 8 Drawing Figures

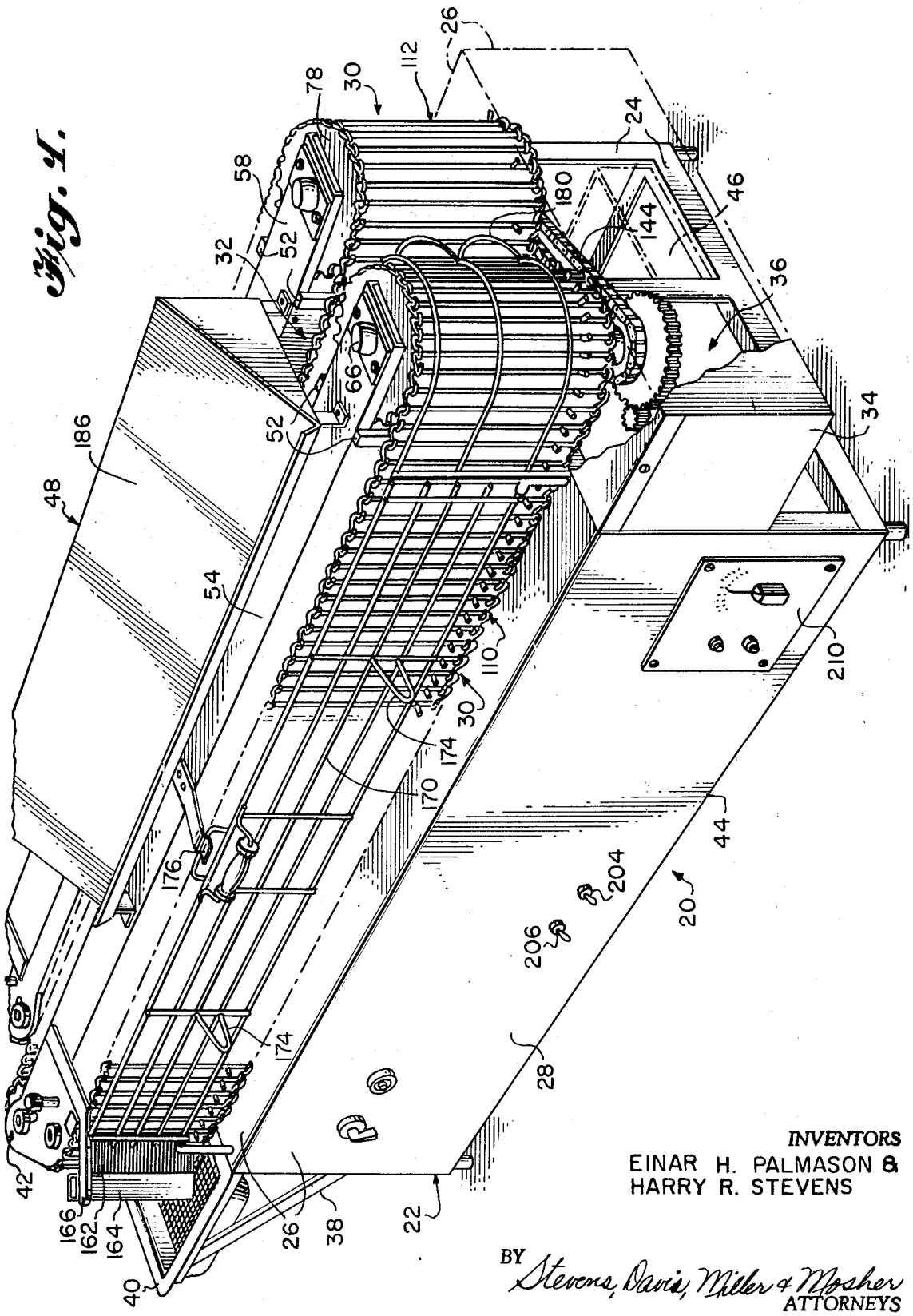

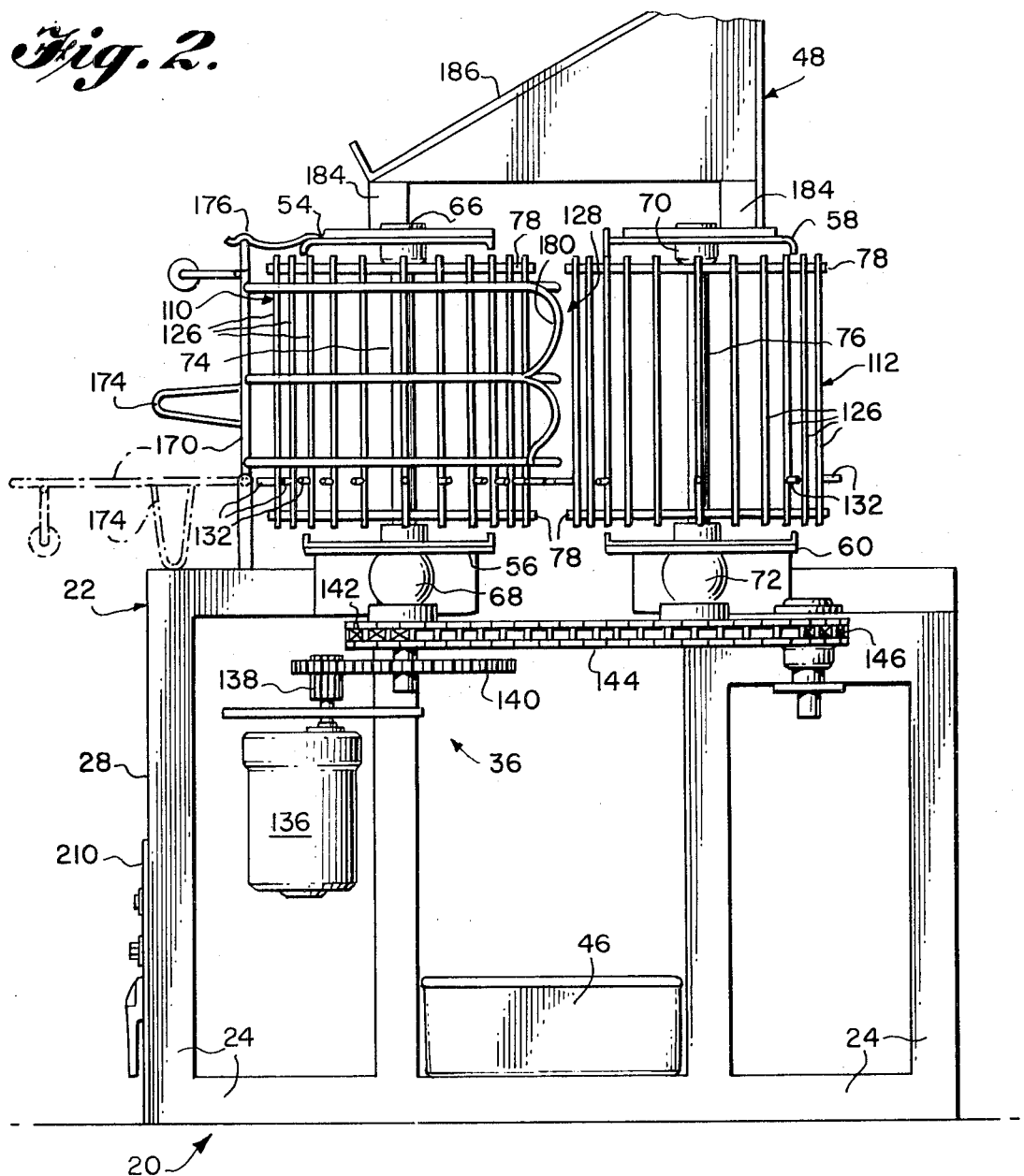

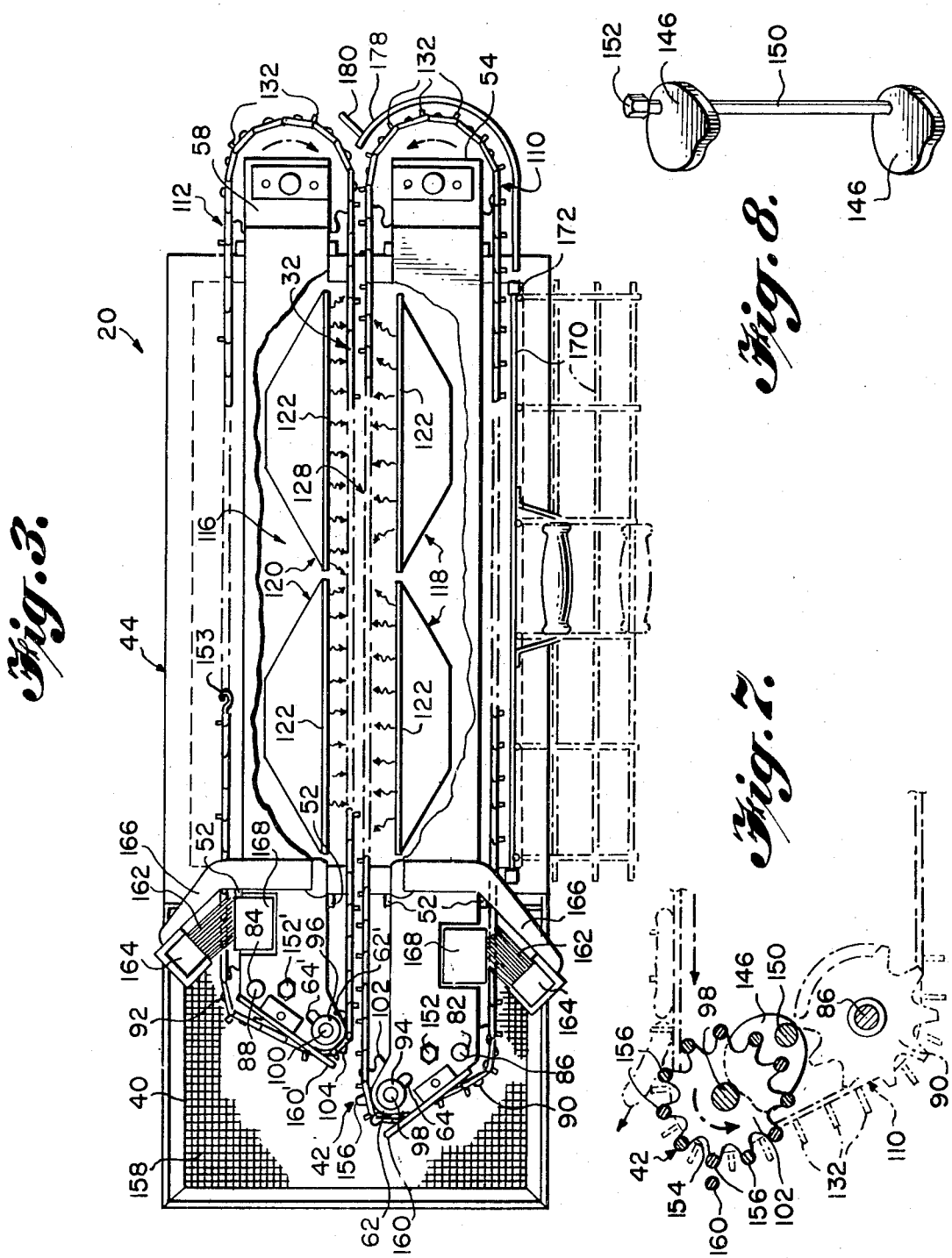

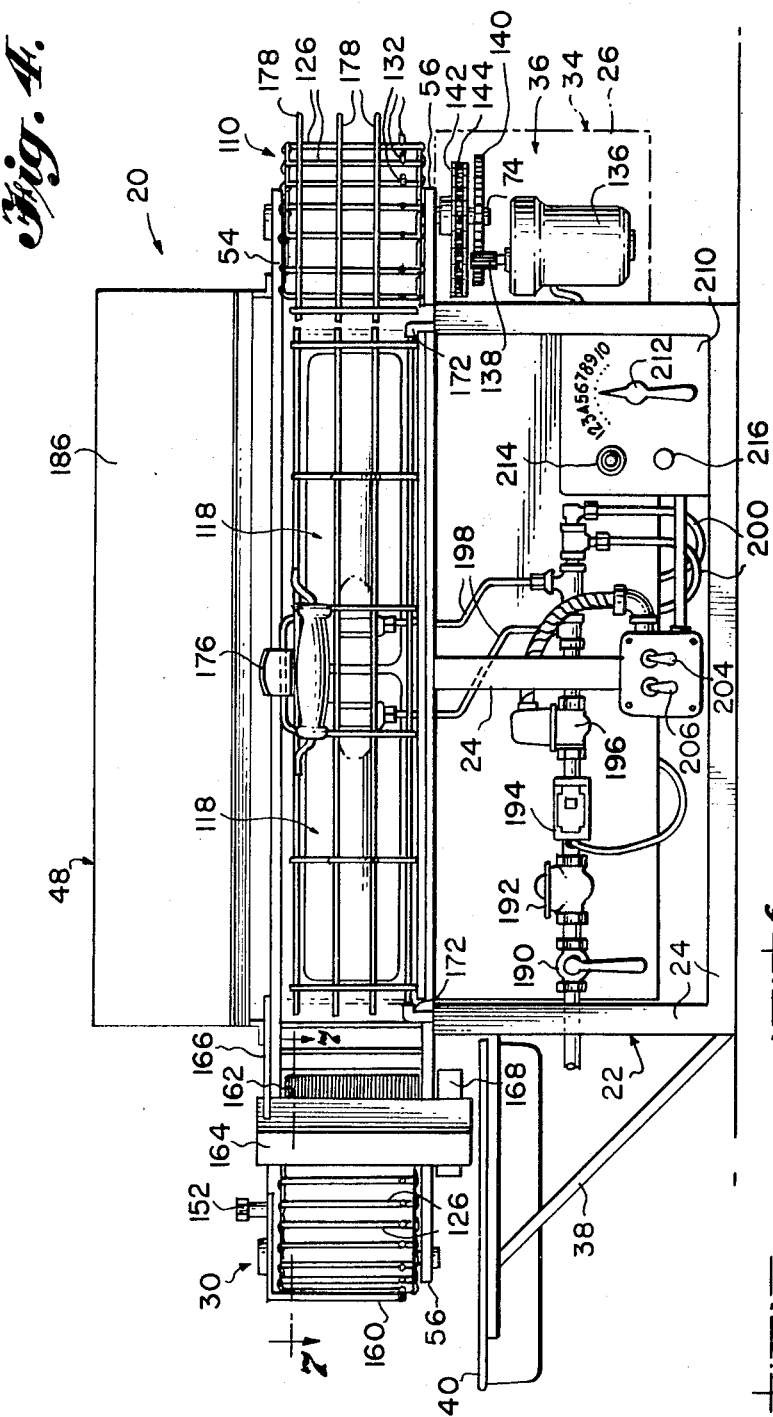

AUTOMATIC BROILING APPARATUS

BACKGROUND OF THE INVENTION

This invention relates to an improvement in an apparatus for continuously broiling comestibles, such as hamburger patties, steaks, chops and the like, and is classified under foods and beverages class 99 in the manual of classification.

This invention relates to an apparatus for continuously broiling comestibles, such as hamburger patties and the like, in a vertical position by passing them through spaced infrared cooking elements so that the comestibles are cooked from both sides in a single operation with the drippings from the comestibles during broiling being removed from the cooking zone.

The improvements in quality and gustatory properties of comestibles cooked by broiling rather than frying are well known and have been the subject of many Letters Patent. The art discloses that broiling by infrared radiation seals the surfaces of the comestible prior to in-depth cooking, thus retaining many of the proteinaceous juices and fats that make the comestible tasty, which are otherwise lost during frying or other forms of cooking.

Such infrared broiling, particularly of hamburger patties, is done by passing each patty between heat sources, usually horizontally disposed, so that the patties can be transported lying flat on a chain or grid over the heat source. Although surface sealing does occur, there is still considerable exudation of fat and proteinaceous juices—which of course falls on the heat source and chars or ignites causing smoke, carrying with it particles of material suspected as being carcinogenic. This smoke permeates up through the patties, spoils the flavor and appearance of the product and in addition carries grease and noxious fumes into the ventilating equipment or into the room in which the cooking is being done, which in itself is a hazard.

It has been observed that such a horizontal placement of the patties between broiling flames or heating elements, with the heating done from above and below, gives some improvement in gustatory characteristics but, with the heat source close enough, or hot enough to truly seal the exterior surface of the patties, considerable splattering and flaming of proteinaceous juices and fats occur, making it difficult to operate the equipment without the hazards of smoke and fires. To overcome this condition, the broiling flames or heating elements are frequently withdrawn from the comestible far enough to prevent this hazard with resultant inadequate broiling of the patties.

To overcome the disadvantages of horizontal broiling, efforts have been made to broil comestibles in a vertical or substantially vertical position by passing them between vertically disposed heating elements. These prior art systems of broiling, while producing an improved quality and flavor and reducing the fire and health hazards inherent in the horizontal broiler, still have inherent in them serious operating difficulties, such as the removal of the comestible from hot carriers needed to support the comestible during the broiling operation. Also, the loading of the carrier and the removal of the comestible from the carrier becomes a problem since, to broil the comestible in a vertical position, there must be side support for it unless it is hung from a hook or clamp, and such loading and removing of the broiled comestible present operation problems that limit the effectiveness of this form of operation.

This invention overcomes the above-discussed difficulties by providing an automatic broiling apparatus which can continuously receive comestibles to be broiled and support them from the bottom and sides in vertical position as they pass through spaced infrared heating elements providing a broiling zone so that the broiling of the comestibles is accomplished from both sides with the outside portion of the comestibles being immediately seared to retain their maximum goodness, and the proteinaceous juices and fats that do exude from the comestibles are directed by gravity from the area of the infrared broiling zone.

The apparatus of this invention also provides for a continuous belt link chain for supporting and guiding the comestibles through the infrared broiling zone so that the comestibles may be broiled in a vertical position while passing through the zone.

Advantageously, the vertical broiling apparatus of this invention may be constructed of two continuous flat chain-link belts on edge, sprocket driven, and so arranged that an elongated slot is formed when a portion of each of the belts comes together in face-to-face relation. In this type of construction, one of the belts turns in a clockwise direction, while the other belt turns in a counterclockwise direction. On the bottom portion of one or both of the chain-link belts are positioned outwardly extending spaced support studs or lugs that are at right angles to the vertical flat portion of the chain-link belt. These studs provide a means for supporting the comestibles, such as a hamburger patty, in a vertical position as the hamburgers are carried, and when the two chain-link belts come together with the hamburger patties in vertical position on one of the chain-link belts, the studs of the belt carrying the hamburgers interdigitate with the studs of the other belt, thereby providing a support base for the hamburger patties and a means for supporting both sides of the patties while retaining them in a vertical position. The slot formed by the two chain-link belts has positioned in back of it and on each side of it infrared heating units that face each other and provide the broiling zone and thus blanket the slot from both sides with infrared radiation to effect the broiling of the vertically supported comestibles as they travel on the belts through the broiling zone.

Advantageously, at the ends of the broiling zone where the chain-link belts part from each other by turning in different directions, one belt can be made to turn first, thus providing a stripping action in those cases where some of the hamburger patties have seared to the chain-link belt that forms the side support and thus must be jarred loose. Also, the sprocket arrangement on the other chain may have tooth extensions or other means associated with it for releasing those hamburger patties that stick to the links of the belt as the belt changes its direction, thereby effecting a stripping of a seared hamburger attached to the link of that belt. Thus, it can be seen that the automatic broiling of comestibles of this invention not only provides for vertical broiling and removal of proteinaceous juices and fats from the cooking zone, but also provides for the automatic stripping of those portions of the comestibles that may adhere to the links of the chain because of searing action to effect a continuous and effective broiling of quality comestible products.

Advantageously, the automatic broiler of this invention is constructed so that the sensible heat developed in the broiling zone is air swept upwardly from the zone, thus providing for the broiling of the comestible substantially by infrared radiation which allows the comestible to be more thoroughly cooked without drying it by loss of most of its proteinaceous juices or fats.

Attached to each of the chain-link belt sprockets may be a cam arrangement that, when operated, releases the tension on the belt. The chain or belt, thus slackened, can be disengaged from its sprockets and disassembled for cleaning.

The sensible heat rising from the broiling zone also provides a source of heating for the toasting of buns to be used when, for example, hamburgers are being prepared by providing above the unit a stationary metal grilling tray which will be kept hot enough to toast the buns by the flow of sensible heat from the broiling zone. Buns can thus be grilled on a metal plate positioned so that the hot gases from the broiling zone, in the case of a gas heater, or rising hot air in the case of an electric heater, will transfer heat to the bun grill or warmer.

A further development is a driven endless belt running horizontally through the hot gases rising from the broiler heat source which carries the buns from one side of the broiler to the other, heating or toasting the opened bun in its passage and discharging the bun into a receiver.

While, advantageously, the broiling is done by radiation, it is recognized that some cooking heat is also going to supplied by convection of the hot gases and by conduction of heat from the hot belt or chain to the comestible. It is generally desirable to use the infrared radiation as the main source of heat and to achieve this, a draft of air is provided for sweeping up between the heat source to remove a large portion of the convection heat in the form of sensible heat.

Since the radiant heat can only enter the comestible through the surfaces exposed to the infrared radiation, the broiling is controlled by regulating the intensity of the radiation, regulating the amount of air being allowed to sweep out convection heat, and by the weight and conductance of the belt material contacting the comestible. These variables need to be controlled to accommodate the broiler to the varying thickness and the conductivity of the comestible itself. For example, when the comestible is thick and of relatively poor conductance, it is generally advisable to intensify the radiation by adjusting gas pressure or power.

It will be appreciated that automatic loading may be used to place the comestible on the belt so that the broiling may be done continuously without interruption except for cleaning of the belts. This feature of easy cleaning, of the belt, of course, provides for highly improved quality in the broiled article and excellent gustatory characteristics.

It has been found that if the heat sources are closely spaced and of light weight, ignition of the gas, in the case of the ceramic burner, or passage of the electric current will rapidly bring the heat level up to the point of infrared emission, so that the heat sources need be activated only when the comestible to be cooked is placed in the carrier and the belts placed in motion. The apparatus of this invention also provides for heat sources to be turned off automatically with stoppage of the belts.

A particular advantage of this invention is that the apparatus can be constructed of a size and shape that will fit into small and restricted operations, with the ease of operation and the simplicity of varying the chain speed to accommodate different sizes and thicknesses of comestibles, there is provided a broiling unit that can produce continuously superior quality broiled comestibles and which can be cleaned and maintained and adjusted for the cooking of various comestibles, particularly meat patties and other meat products, such as steaks, chops and the like.

Reference is now made to the drawings.

FIG. 1 is a view in perspective of the broiling apparatus of the invention showing the moving conveyor belts or grids supported above the apparatus base, one end of which is partly broken away to reveal the drive mechanism motor, gearing and drive chain;

FIG. 2 is an end view in elevation of the apparatus of FIG. 1;

FIG. 3 is a top plan view of the apparatus partially broken away to show the arrangement of gas-fired infrared broiling elements;

FIG. 4 is a front elevational view of the apparatus with the base open at the front to show the controls for the broiling elements;

FIG. 5 is a view in elevation of a fragmentary portion of one of the conveyor chain-link belts showing its open gridlike character and support studs;

FIG. 6 is a plan view of the belt of FIG. 5 taken from view plane 6—6 thereof;

FIG. 7 is a sectional view in plan taken from view plane 7—7 of FIG. 4, showing the food removing bar and sprocket arrangement of the stripping means with a portion of the front conveyor and comestible indicated in broken lines; and FIG. 8 is a perspective view of the arrangement of the conveyor belt tension releasing cams for the front conveyor.

Referring to the drawings, the broiling apparatus, designated generally by numeral 20, has a supporting base 22 constructed of framing members 24 and is covered on outer top and side portions with a removable stainless steel sheathing 26 which includes a front panel 28 covering the front side of the apparatus base. Top edge portions of the sheathing provide smooth cleanable surfaces 29 which may be useful as a temporary support of small articles such as condiment containers or others articles used when preparing the food to be eaten.

Above the base and supported by it at a height convenient to the operator or food worker for the broiling and preparing of hamburger patties and other like comestibles, is a food broiler unit 30 which in operation provides for a rapid and healthful infrared cooking of such food articles by passing them through a broiling or cooking zone 32 located centrally in the unit.

Base 22 is extended at one end to form a protective housing 34 for enclosure of a drive mechanism 36 which, when energized, operates the movable portions of the broiler unit, which convey the comestibles from the loading area at the front through the broiling zone and deposit the broiled comestibles at the left of the unit. For this purpose, at its other or left end, the base has an angular bracket 38 which supports below the discharge end of the broiler unit a panlike receptacle or tray 40 which is the means for receiving and collecting the broiled comestibles such as hamburger patties as these are automatically discharged from the broiler unit by aid of an associated stripping means or rods 42. The stripping means provides for a positive automatic removal of the hamburger patties issuing from the broiler unit into the receptacle after the broiling cycle is completed. A central portion 44 of the base is open down through its upper surface to provide a passage for dripping off of proteinaceous juices and fats into a pan or trough 46 and also provides an enclosed area in which the heating fuel supply equipment and electrical and other controls for operating the broiler unit are supported from the framing members near the front (see FIG. 3).

A warming device 48 is also associated with the broiler unit and supported by it above the cooking zone. The device provides a means to either warm or toast one or more hamburger buns or the like by utilizing sensible heat that is conveyed from the broiling zone of the broiler unit while the unit is in operation (see FIG. 1).

The broiler unit 30 itself is supported by left and right end pairs of front and rear vertical support stanchions 52 which extend up from their attachment to framing members of base 22 near each end of the unit. Bolted to the stanchions are a pair of flat, upper and lower front frame plates 54, 56 and a pair of somewhat shorter flat upper and lower rear frame plates 58, 60. The frame plates are arranged horizontally, with upper frame plates spaced apart side by side longitudinally of the unit and corresponding lower frame plates similarly arranged. The upper and lower frame plates of each front and rear pair are maintained vertically spaced apart by their attachment to the stanchions. Right-hand ends of the frame plates are in front to rear alignment, but the left-hand ends of the front frame plates extend beyond the corresponding ends of the rear frame plates due to having greater length. It can be seen that both the upper and lower frame plates are angled inwardly at their left ends to form a respective front and rear projection 62, 62' and each respectively defines a front and rear angled slot 64, 64'.

Positioned in the right-hand ends of the two pairs of frame plates are a set of upper and lower front right-end conveyor sprocket bearings 66, 68 and a set of upper and lower rear right-end conveyor sprocket bearings 70, 72. Each set of sprocket bearings respectively supports for rotation a pair of front right-end and rear right-end conveyor sprocket shafts 74, 76 in upright position. Attached to each of the shafts is an upper and a lower right-end conveyor sprocket 78 for moving and guiding the chain or conveyors at the right end of the apparatus.

In the outer left-hand end of each frame plate are positioned a set of stationary upper and lower, front and rear guide sprocket bearings 82, 84, each set respectively supporting, in vertical position, front and rear guide sprocket shafts 86, 88, and each of these carries a set of upper and lower, front and rear guide sprockets 90, 92 for supporting and guiding the conveyor at the outer left-end portion of the apparatus. The inner or confronting portion of the frame plates at the left-hand end also have an upper and lower moveable set of front and rear tension sprocket bearings 94, 96, are adjustably positioned in slots 64, 64' and support for rotation a respective front and rear tension sprocket shaft 98, 100, each carrying a set of upper and lower, front and rear tension sprockets 102, 104.

The respective front and rear sets of the conveyor, guide and tension sprockets are positioned in the broiler unit 30 so as to support, looped around them, front and rear chain-link-type conveyor belts 110, 112 providing open grid means for holding and conveying the hamburger patties to be cooked through the broiling zone 32 within a cooking oven or area 116 located centrally in the broiler unit.

The cooking area 116 has oppositely positioned sets of front and rear infrared-type heating elements 118, 120, that form the broiling zone, supported from the base and located between the respective front and rear pairs of upper and lower frame plates so the reflectors of the elements direct heat inwardly to the broiling zone from its opposite sides for simultaneously cooking both sides and into the center of food passed through the zone (see FIG. 3). The reflector of each heating element is provided with a covering quartz lens 122 and suitable combustion product exhaust means (not shown).

Each of the conveyor belts 110, 112 is formed of a connected series of vertical chain-linked bars 126 and has its free ends releasably connected together to form an endless loop at the front and rear, respectively. The belts of each group extend at the right end around the respective sets of conveyor sprockets 78 and at the left end around the respective sets of guide sprockets 90, 92 and tension sprockets 102, 104. This arrangement positions the belts so their flat surfaces are substantially vertical and form the opposite flattened loops so that about one-half of each loop is in uniformly spaced confrontation to its opposite, down the longitudinal center of the broiler unit so as to form between them an elongated vertical slot 128 for supporting between them hamburger patties and to carry the supported patties vertically on edge through the broiling zone.

Each conveyor belt is provided along its lower outer surface with a shelflike support means formed of a series of outwardly projecting individual short lug or stud supports 132 welded to every bar of the belt in the case of the front belt, and to very fourth bar in the case of the rear belt. Bars of the respective belts are located horizontally offset relative to one another such that the projecting stud supports of the belts interdigitate when the belts come together to from the elongated slot in its broiling zone to provide a continuous foraminous lower support for the comestible as the belts move through the broiling zone.

The belts are adapted to be moved in counterrotating fashion, one rotating clockwise and the other counterclockwise, and have their confronting surfaces come near together so as to support without compressing the comestible, such as hamburger patties, and to support the comestible vertically between them and guide the comestibles edgewise between the sources of cooking radiation as provided for by the heating elements positioned behind the respective confronting broiling grids provided by the belts. As the belt moves through the broiling zone, heat is thus cast onto both sides of the comestible at a controlled rate, thereby broiling the comestibles as they move through the broiling zone between the heating elements.

Movement of the belts in unison is accomplished by the drive mechanism 36 which includes a variable speed electric motor 136 supported from the framing and having its output shaft connected to a pinion 138 which turns a drive gear 140 when the motor is energized. The drive gear is fixed to the lower end of conveyor shaft 74 which also has attached to it a front drive sprocket 142. Rotation of the front conveyor shaft 74 on motor action also effects turning of rear conveyor shaft 76 through a drive chain 144 engaging around the front drive sprocket and at the rear around a rear drive sprocket 146. The rear drive sprocket is operably connected by gears (not shown) to the shaft 76. Gear and sprocket ratios are selected so when the motor is energized, front and rear conveyor belts are rotated so their vertically disposed surfaces move horizontally along the path of the loops and at the same speed of movement.

FIGS. 7 and 8 illustrate the arrangement of tension cams 146 for tightening the front set of tension sprockets 62 against its belt by sliding the sprocket bearings 94 in the angled slot 64. This is accomplished by an adjustable engagement of the cams against the tension sprocket shaft 98 so its set of sprockets 102 holds the belt properly tensioned for operative rotation as in FIG. 7, or the tension can be released to slacken and remove the belt, e.g., for cleaning, when the cam shaft 150 connecting the cams is rotated counterclockwise. A similar set of cams and shaft of opposite hand (not shown) are provided for tensioning or slackening and release of the rear belt. Cam lock nuts 152,152' are provided at the top of each cam shaft for locking of the cams in the position selected. The belts may be removed after slackening by disengaging links 153 from their attached position in the chain belt.

FIG. 7 also shows the action of the rotatable stripping means 42 which removes the comestibles from the belts. The stripping means or device is provided as follows: The upper and lower nibs 154 of the front upper and lower guide sprockets are joined by vertical rods 156 arranged to protrude through the open space between the bars 126 of the front belt as the bars pass from the inner side of the front loop just beyond the place where the front and rear belts open apart and diverge in their counter rotation. The rods 156 press against the comestible, through the grid of the belt and strip the food from it releasing the food off of its support on the studs when it then falls onto a drain screen 158 in the collection receptacle 40 on completion of a cooking cycle. A pair of angular stationary stripper bars 160, 160' are suspended from the upper frame plates with a lower leg of each wire respectively vertically positioned alongside the discharge end of its conveyor belt and acting as barriers blocking continued travel of a comestible beyond the tray 40 by knocking off of the belts any comestible which may stick to them.

A belt-cleaning means is provided in the form of brushes 162, set in holders 164 and supported from brush arms 166 which attach to the respective upper and lower framing plates. Each brush has light wire-type bristles which impinge on the belts and clean them of cooked-on particles of food as the belts are moved past the brushes. Removed food particles are allowed to fall into particle receivers 168 set below notched out portions of the frame plates opposite the brushes.

The broiler unit 30 has a quick-loading device provided by a vertical gate 170 formed of a grid of wires hinged at the pivots 172 so it can be moved from a closed or up position slightly spaced from the outer surface of the front belt, to a lower or open position, as indicated in FIG. 3 by broken lines. The gate is partly supported when in its lower position by gate legs 174, which then rest on the upper surface of the base 22. Hamburger patties can thus be laid flat on the inner surfaces of the gate when it is opened and then lifted by the operator (not shown) and secured in the up position by latch 176. This action automatically loads the patties into vertical position on the front belt supported on the studs 132. A vertically arranged series of horizontal guide rails 178 extend from the edge of the gate at the front right end of the unit and pass in a curve partially around the right end portion of the front belt loop to maintain the patties neatly on the front belt until they are supported between the front and rear belts as these close or come together to form the elongated slot. A wire guard 180 is provided to help guide the comestibles into the elongated slot formed by the conveying belts.

It will be appreciated that the apparatus of this invention provides for the removal of sensible heat generated from the cooking zone by forced air convection and directs it under the bun-warming device 48 to heat it. The bun-warming device is supported over the cooking zone on legs 184 and has a flat upper warming or toasting surface 186 that is a tray angled upward to the rear so bread, buns or the like can be laid face down on it handy to the operator and also provide for directing convection or other currents of heated air beneath the toasting surface for exhaust at the rear of the apparatus. Such air can be discharged through a suitable duct means (not shown) as desired.

Gas for supplying fuel to the gas-fired infrared cooking or heating elements 118, 120 is fed from an external source (not shown) through a manual shutoff valve 190 to a recording flowmeter 192, then through a thermostatically controlled cutout valve device 194. Pilot gas lines (not shown) also extend from the discharge side of the device 194 to the heating elements to supply them with fuel for operation of their pilot flames. The valve device 194 also is provided with the necessary thermostatic sensors extending to the heating elements so that it shuts off the main gas supply in the event of flame failure. From valve device 194, gas is supplied to a magnetic control valve 196, then through gas lead lines 198, 200 which individually supply the gas to the respective front and rear heating elements. The control valve has its operating mechanism electrically interconnected with the drive motor 136 so that electric current, when current is flowing to the motor, keeps the control valve open thus supplying cooking fuel to the heating elements only when the motor is operated to rotate the belts.

An electrical switch 204, which can be labeled "Motor," is provided to electrically actuate the motor and energize control valve 196. A second electrical switch 206, which can be labeled "Broiler," is connected into the circuit to the control valve so, when in "on" position, operation will be as above and, when in "off" position, breaks the electrical circuit so cooking gas is not supplied to the heating elements.

A control panel 210 contains a temperature control mechanism and a motor speed control transformer for respectively setting the desired cooking temperature by knob 212 and motor speed by hand control 214. A pilot light 216 indicates when the cooking elements are producing broiling heat.

Satisfactory cooking of hamburger patties or comestibles is obtained with the invention when the link-chain belts or grids are from about 4 to about 8 inches in height and, in operation, form closed loops from about 25 to 50 inches in length and from about 6 to 24 inches wide and are moved at a rate of about 12 to about 26 inches per minute, utilizing an elongated gap or slot between the belts of about three-eighths to about 1¾ inches. It is preferred to use conveyor belts 6 inches high having three-sixteenths-inch bars and a one-half-inch gap or span between their confronting surfaces. This size belt has been found to cook hamburger patties satisfactorily at a rate of about six hamburgers per minute when a preferred front loop size of about 40 inches long by 12 inches wide is employed (the rear loop is slightly shorter so as to provide a means for discharging the broiled patties) and the chain belts operated together at a rate of from about 18 to 20 inches per minute.

In use, electrical power is supplied to the motor and the various gas and electrical controls by connecting electrical power from a source (not shown) into the junction box containing switches 204, 206. With gas supplied into valve 190, its handle is turned to place the valve in its "gas on" condition and the pilot flames in the heating elements ignited. The motor switch 204 is turned on, which energizes the motor and starts rotating the conveyor belts. Broiler switch 206, is then turned, which causes cooking gas to be supplied to the burner units and ignited for supplying the infrared broiling or cooking heat.

The operator then opens the loading means or gate 170 and places preformed hamburger patties on the inner side of it. He then lifts the gate into its latched closed position, thus loading one or more patties simultaneously onto the front side of the front belt 110 so they are supported by its projecting studs 132. Rotation of the belt immediately carries the patties successively around the right end of the front belt and into the slot 128 where front and rear belts converge and close around the patties with the rear belt adding support. The patties are then automatically conveyed in the slot between the belts and passed edgewise horizontally through the broiling zone between the cooking elements where they are broiled according to the predetermined desired length of time and cooking heat and, where the belts diverge to open, they are automatically dislodged by means of the rotatable stripper mechanism and/or bars 160, 160' and discharged into the receptacle 40 where they are in convenient reach of the operator for use.

It will be appreciated that the width of the gap or slot between the confronting chain belt surfaces advantageously can be adjusted by belt positioning means (not shown) operatively associated with one or both belts and the speed of the belt movement suitably adjusted to accommodate various size comestibles, e.g., meat patties or thick steaks and chops, and cook them at the proper rate to provide varying degrees of cooking such as well done or rare.

It will be further appreciated that the apparatus of this invention may be made in various sizes according to the volume of broiled products desired. For example, where large production is necessary, the elongated slot and the broiling zone may be made much longer and the conveying means operated at an increased rate of speed so that the residence time in the broiling zone is that which is necessary to broil the comestible the required degree. Also, a substantial increase in the broiling rate can be achieved by throttling the inflow of air into the space between the radiant heating elements.

What is claimed is:

1. An apparatus for successively broiling units of comestibles comprising: a broiling zone formed from oppositely positioned irradiating heating means; means for energizing said heating means; a substantially horizontal movable conveyor means, said conveyor means formed from two spaced-apart members, one of said members comprising a rotating continuous chain-link belt on edge that comes together with the other member within the broiling zone to form an elongated slot therebetween for supporting comestibles therein on both sides as the belt travels through said broiling zone and then separates from the other member after passage through said broiling zone by turning away from said member to discharge said comestibles from the conveyor after broiling, said continuous belt having an open grid surface throughout its length adapted to receive comestibles subsequent to the turning away travel by the belt and before the turning inwardly travel by the belt and support means for supporting the comestibles in a vertical position on said grid surface, a hinged elongated grid gate mounted adjacent the belt having an open grid surface and turnable from a horizontal position whereat the comestibles can be placed on to a vertical position whereat the comestibles are transferred to the open grid surface of the belt, and means to drive the continuous chain-link belt.

2. The apparatus of claim 1 in which said conveyor means is formed from two continuous chain-link belts on edge, one belt rotating clockwise and the other belt rotating counterclockwise.

3. The apparatus of claim 2 in which each of said belts is sprocket driven.

4. The apparatus of claim 3 in which the sprocket of at least one of the belts where the belts turn away from each other has means for extending through the chain links of the belt for pushing the comestible from it in those cases where it has seared to the chain links.

5. The apparatus of claim 4 in which said means that extend through the chain links are sprockets having elongated teeth.

6. The apparatus of claim 2 in which a comestible removal bar is operatively associated with said chain-link belts as they turn away from each other to strip any comestibles that have seared to the chain links.

7. The apparatus of claim 2 in which each of said chain-link belts is sprocket driven and one of said sprockets on each of said belts has cam means operatively associated therewith for slackening said belt for its removal for cleaning.

8. The apparatus of claim 2 in which one of the links in the chain of each of said belts is removable so that the belts can be removed for cleaning.

9. The apparatus of claim 1 further comprising guide means for maintaining said comestibles positioned on the open grid surface of the belt means in a vertical position on said belt until they travel into the broiling zone.

10. The apparatus of claim 1 in which said support means on the open grid surface of the belt comprises spaced stud supports at the bottom thereof for supporting the comestible in vertical position.

11. The apparatus of claim 1 in which said conveyor means has cleaning means operatively associated therewith for cleaning seared portions of comestibles from it during passage to the broiling zone.

12. The apparatus of claim 1 in which said broiling zone has positioned below it a residue trough for collecting proteinaceous juices and fats exuding from said comestibles during broiling.

13. The apparatus of claim 1 further comprising a receiving tray mounted beneath the belt and the other member at a point where the belt separates from the other member to receive the discharged broiled comestibles.

14. The apparatus of claim 1 in which said irradiating heating means has a thermostat control operatively connected thereto for controlling the temperature in the heating zone.

15. The apparatus of claim 1 in which said means for energizing said conveyor means has speed control means operatively connected thereto for varying the speed of travel of the conveyor through the broiling zone depending upon the requirements for broiling.

16. The apparatus in claim 1 in which said broiling zone has positioned above it a grill means which is heated from sensible heat rising from said broiling zone.

17. The apparatus in claim 1 in which said irradiating heating means are gas-fired ceramic plates.

18. The apparatus of claim 1 in which said irradiating heating means are electrically energized.

19. The apparatus of claim 1 in which a control means is operatively connected between said irradiating heating means and said conveyor means to deenergize the heating means when said conveyor means is inoperative.

* * * * *